(12) United States Patent
Queveau et al.

(10) Patent No.: US 7,300,093 B2
(45) Date of Patent: Nov. 27, 2007

(54) MOTOR VEHICLE EQUIPPED WITH A PRESSURE-SENSITIVE TAPE NEXT TO THE EDGE OF AN OPENING

(75) Inventors: Paul Queveau, Montravers (FR); Régis Dubreuil, Cholet (FR); Marc Baudeau, Bretignolles (FR)

(73) Assignee: Heuliez, Cerizay (FR)

( * ) Notice: Subject to any disclaimer, the term of this patent is extended or adjusted under 35 U.S.C. 154(b) by 0 days.

(21) Appl. No.: 11/341,009

(22) Filed: Jan. 27, 2006

(65) Prior Publication Data
US 2006/0192409 A1 Aug. 31, 2006

(30) Foreign Application Priority Data
Jan. 28, 2005 (FR) .................. 05 00892

(51) Int. Cl.
*B60J 7/00* (2006.01)
(52) U.S. Cl. ............................... 296/107.04
(58) Field of Classification Search ......... 296/107.04; 49/26, 28
See application file for complete search history.

(56) References Cited

U.S. PATENT DOCUMENTS

| | | | | |
|---|---|---|---|---|
| 3,622,197 A | * | 11/1971 | Vogelei et al. ............ | 296/96 |
| 3,910,628 A | * | 10/1975 | Nantau ..................... | 296/222 |
| 4,251,102 A | * | 2/1981 | Lee .......................... | 296/160 |
| 4,262,956 A | * | 4/1981 | Kellam .................... | 296/26.07 |
| 4,265,479 A | * | 5/1981 | Langston ................. | 296/100.14 |
| 4,272,123 A | * | 6/1981 | Mori ........................ | 296/222 |
| 4,626,026 A | * | 12/1986 | Hasegawa ................ | 296/218 |
| 5,520,432 A | * | 5/1996 | Gmeiner et al. ......... | 296/107.01 |
| 5,734,727 A | * | 3/1998 | Flaherty et al. ......... | 296/216.04 |
| 6,010,178 A | * | 1/2000 | Hahn et al. .............. | 296/136.06 |

FOREIGN PATENT DOCUMENTS

| EP | 0 870 892 A2 | 10/1998 |
|---|---|---|
| EP | 0 916 538 A2 | 5/1999 |

\* cited by examiner

*Primary Examiner*—Kiran B. Patel
(74) *Attorney, Agent, or Firm*—Nawrocki, Rooney & Sivertson, P.A.

(57) ABSTRACT

The invention relates to a motor vehicle (1) and, mainly a cabriolet-type vehicle, comprising at least one opening (3, 4) in which the opening and closing movements are activated by driving means controlled by a control unit, said opening (3, 4) having at least one inner surface turned towards a part of the vehicle (1) to be covered and at least one edge (10) situated facing an element of the body or a mobile part of said opening when the opening (3, 4) is in its closed position, characterised in that a pressure-sensitive tape, which can emit a signal according to said pressure, is placed on the inner surface next to said edge, said control unit being arranged so as to modify the kinematics of the movement according to the pressure signal measured during said movement.

17 Claims, 5 Drawing Sheets

MOTOR VEHICLE EQUIPPED WITH A PRESSURE-SENSITIVE TAPE NEXT TO THE EDGE OF AN OPENING

BACKGROUND OF THE INVENTION

The invention relates to an opening of a motor vehicle in which the closing and/or opening movements are activated by driving means. More particularly, the invention relates to openings for cabriolet-type vehicles, and mainly a boot lid or a retractable roof consisting of several rigid roof elements.

In the previous technique, there are known openings for convertible motor vehicles in which the opening and closing movements are activated by driving means.

One of the problems with this type of opening is to secure the opening and closing of the opening, in particular during an automatic movement. In particular, the edges of the opening situated next to the body of the vehicle or to any other mobile part of the opening when the opening is closed can pinch objects or bodies.

In particular, the edge situated in the periphery of the boot lid can pinch hands or incorrectly positioned objects between the body element and the edge of the boot lid.

Likewise, the front and rear edges of the roof element can pinch a finger or a hand placed between a roof element and the crosspiece of the windscreen or between two roof elements.

The previously described pinches are particularly dangerous. In fact, the openings are activated by hydraulic or electrical actuators, which are particularly powerful due to the weight of the openings.

SUMMARY OF THE INVENTION

In the previous technique, there are known contactless sensors, such as capacitive sensors, which enable detection of any interference between the opening and a body or an object. However, these contactless sensors have the disadvantage of being sensitive to the environment (rain, wind, brief passing of a body). This sensitivity to the environment can lead to untimely stopping of the movement of the opening.

Also described in patent applications EP 0 916 538 A and EP 0 870 892 A are contact sensors that make it possible to prevent pinching between the edges of an opening such as a sunroof and the body of a vehicle.

For this purpose, the previously mentioned patent applications suggest integrating a pressure sensor in the seal placed between the opening and the body of the vehicle.

However, integrating a pressure sensor in a seal entails many disadvantages.

In fact, the seal is subjected to considerable stress, especially if it is applied to an opening such as a retractable roof or a motorised boot lid. This stress can result in wear and tear of these sensors and thus in a reduction of the reliability of the pressure measurements taken.

In addition, the sensor cannot distinguish between the pressure exerted on the seal by the body element and the pressure exerted by foreign bodies or objects. Consequently, the pressure measurement is inaccurate.

In addition, the hardness of the seals can change over time and according to temperature. Consequently, the accuracy of the pressure measurement taken by the sensor is at a risk of deteriorating over time.

Finally, the integration of sensors built into the seals of a mass-produced vehicle is not so easy. In fact the integration of this type of sensors would require replacing the seals of the openings.

The invention aims to provide a solution for detecting the presence of an object or a body, that is both straightforward, reliable, inexpensive, small and easy to integrate in a vehicle.

For this purpose, the invention provides a motor vehicle, mainly a cabriolet-type vehicle, comprising at least one opening in which the opening and closing movements are activated by driving means controlled by a control unit, said opening having at least one inner surface turned towards the part of the vehicle to be covered and at least one edge situated facing a body element or a mobile part of said opening when the opening is in its closed position, said vehicle having a sealing device placed between said opening and a body element of the vehicle or between two mobile parts of said opening, said vehicle being characterised in that it comprises a pressure-sensitive tape that can emit a signal according to said pressure, separated from said seal and placed on the inner surface next to said edge, said control unit being arranged so as to modify the kinematics of the movement according to the pressure signal measured during said movement.

Thus, the opening and closing movements of the openings are secured at the level of the edges of the openings.

One advantage of detection using a pressure-sensitive tape rests in the fact that such a sensor enables a natural distinction to be established between interferences that should and should not be taken into consideration. In fact, such a sensor only reacts after an actual contact. Thus, the sensitivity to the outside environment is considerably reduced.

In addition, the invention has the advantage of being able to accurately measure the pressure exerted on the sensors. Thus, it is possible to change the kinematics of the movement of the opening differently according to the pressure exerted.

BRIEF DESCRIPTION OF THE DRAWINGS

Further objectives and advantages of the invention will appear during the following description, made in reference to the appended drawings, in which:

FIGS. 8 and 9 show different scales of the invention applicable to the roof elements wherein FIG. 9 is a detail shown in the circle of FIG. 8.

DETAILED DESCRIPTION OF THE INVENTION

Figure 1:
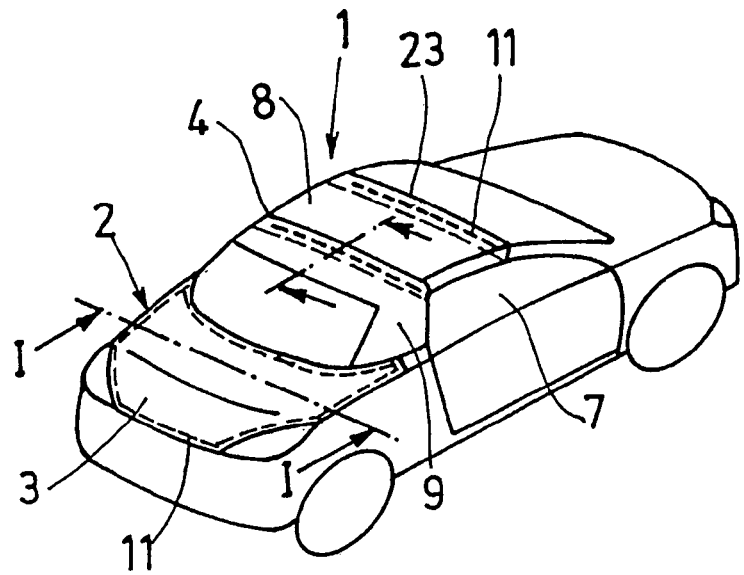
FIG. 1 shows a motor vehicle of the convertible type with retractable roof in which the edges that can pinch a body or an object during the movement of the openings are indicated with a dotted line.

The vehicle 1 comprises a boot 2 provided with a lid 3.

The lid 3 has two opening positions. In fact, the lid 3 can be opened at will from front to back to store the retractable roof 4 or from back to front to access the luggage compartment. For this reason, the lid 3 of the boot comprises release hinges 5, 6 situated to the front and rear of the lid.

The retractable roof 4 consists of roof elements that can move between an unfurled position in which they cover the passenger compartment 7 of the vehicle 1 and a retracted position in which they are stored in the boot 2 of the vehicle 1.

In the embodiment of the invention shown in FIG. 1, the roof 4 consists of a front roof element 8 and a rear roof element 9. The roof elements are linked to each other and to the chassis.

The opening and closing movements of the retractable roof 4 and of the lid 3 of the boot 2 are activated by driving means 30. The driving means are controlled by a control unit 28.

Figure 2:
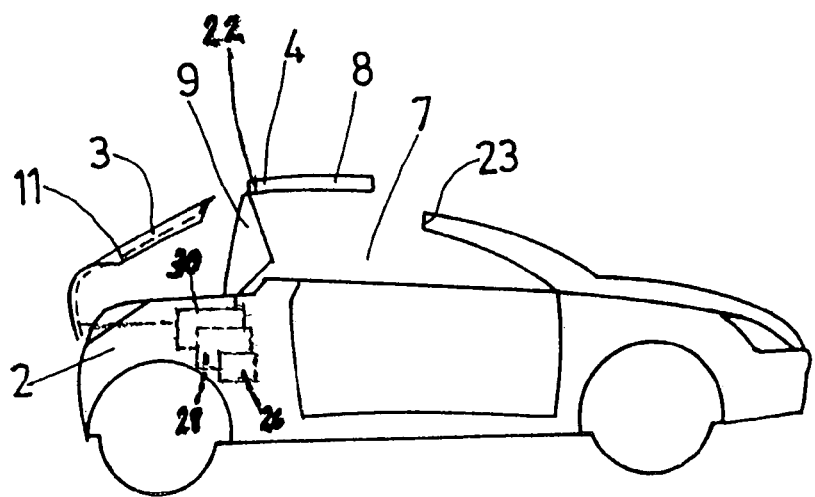
FIG. 2 shows a side view of the vehicle in FIG. 1, the roof and the boot lid being in an intermediate position.

In the embodiment of the invention described in detail in FIGS. 1 and 2, the edges 10 that entail a risk of pinching are shown by the dotted lines. To solve this problem, pressure-sensitive tape 11 is applied on the inner surface 12 of the openings 3, 4 next to the edges 10 of the openings. The inner surface 12 of these openings 3, 4 is the surface that is turned towards the part 2, 7 of the vehicle to be covered.

The inner surface 12 of the roof elements 8, 9 is therefore the surface of the roof elements 8, 9 that is turned towards the passenger compartment 7 of the vehicle 1. Likewise, the inner surface 12 of the boot 2 lid 3 is the inner surface 12 that is turned towards the boot 2 of the vehicle 1.

The sensors 11 are presented in the form of a thin tape with a thickness of several tenths of a millimetre. The tape 11 is made up of several superimposed layers. A layer of pressure-sensitive material, such as a semi-conductor material, is inserted between two layers of a conductor material, which form the electrodes.

A pressure exerted on the tape 11 changes its electrical resistance. The variation in the electrical resistance can be easily detected and measured. Thus, the pressure-sensitive tape 11 employs means for generating a pressure signal 26 according to the pressure exerted.

The vehicle 1 is also equipped with a control unit. This control unit 28 comprises a device for analysing and comparing the detected pressure signal, a computer and a device for controlling the driving means. Thus, the control unit 28 is arranged so as to modify the kinematics of the movement according to the pressure signal measured during the movement of the opening 3, 4.

The modification of the kinematics of the movement of the opening 3, 4 consists of slowing, stopping or reversing the movement.

It should be noted that the range of pressures detected is very broad, extending from several grams per square centimetre to several kilograms per square centimetre. This enables, mainly, the setting of detection thresholds and, particularly, the setting of rising levels.

In an embodiment of the invention, it is planned to set three detection thresholds. These detection thresholds enable modifications to be made to the kinematics of the movement that vary according to the pressure exerted.

The operation of the control unit 28 is as follows: the control unit analyses the signal emitted by the pressure-sensitive sheet. The control unit then compares the emitted signal with the rising detection thresholds. Finally, according to the comparison of the signal emitted by the pressure-sensitive sheet, the control unit 28 controls the driving means 30 so as to modify the kinematics of the movement of the opening 3, 4.

The first threshold is the lowest detection threshold. Detection signals that are lower than this threshold do not cause any modification of the kinematics of the movement of the opening 3, 4. Thus, the sensitivity to external events is limited. On the other hand, all detection signals above this threshold cause a slowing of the movement of the opening 3, 4.

Surpassing the second threshold causes the movement of the opening 3, 4 to stop.

Finally, surpassing the last threshold or the upper detection threshold causes a reversal of the movement of the opening 3, 4.

In an embodiment of the invention, it is also possible to contemplate monitoring the changes in pressure over time and/or the rate at which these changes speed up. These parameters can also be compared with the thresholds in order to modify the movement of the opening 3, 4 in a different fashion.

According to an embodiment of the invention, the detection thresholds change according to the areas to be protected. In particular, very risky areas such as the front 13 or rear 14 edges of the lid 3 or the front and rear edges 15 of the roof elements 8, 9 need to be protected with lower pressure thresholds.

The implementation and integration of a pressure-sensitive tape 11 in a vehicle is extremely straightforward. In fact, it is sufficient to fix the tape 11, for example by gluing or by adhesion directly on an inner surface 11 immediately next to the edge 10 of the lid 3 or of the roof 4 that is likely to meet a body or an object. As an alternative, the pressure-sensitive tape 11 can be fixed to a strip 16 of an elastic material.

Figure 3:
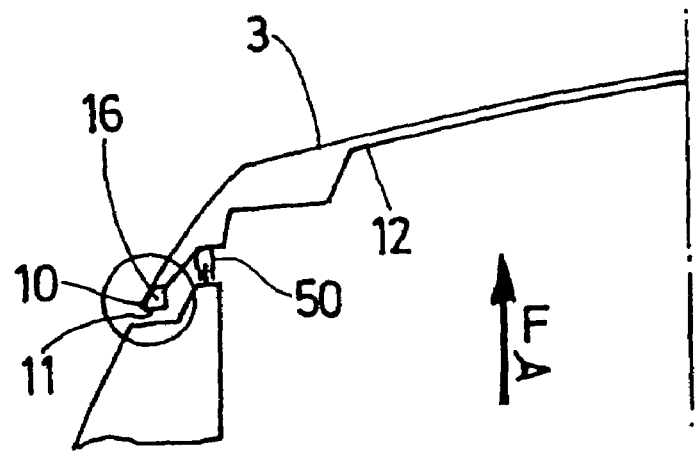
FIG. 3 shows a cross section along the axis 1-1 of FIG. 1 showing a boot lid according to the invention.

According to the embodiment of the invention described in detail in FIG. 3, the pressure-sensitive tape 11 is fixed to the inner face 12 of the lid 3 of the boot 2, next to the edge 10. In particular, the tape 11 is therefore separated from the seal 50.

Figure 4:
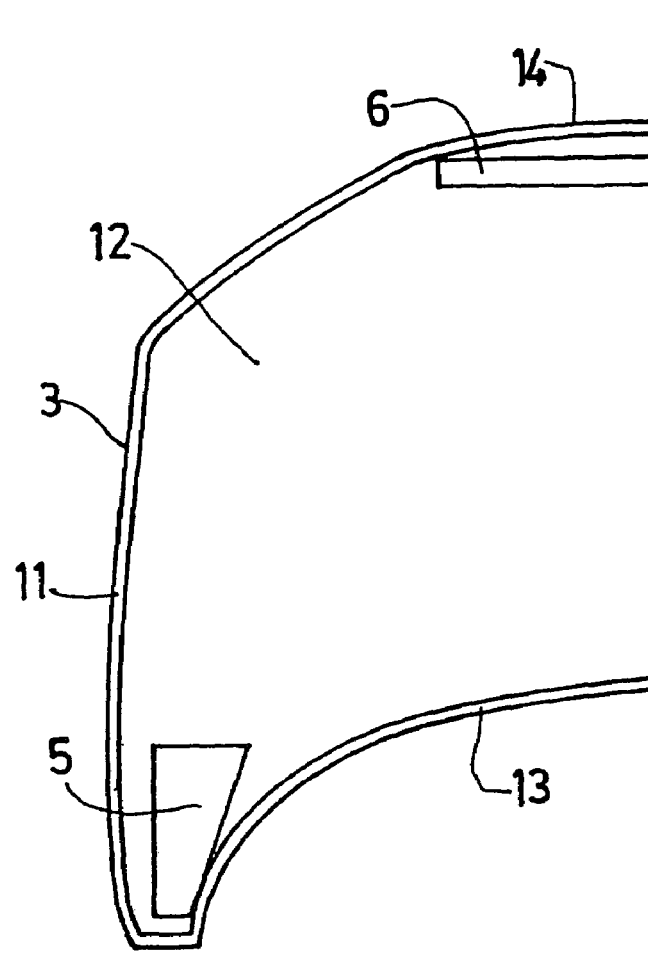
FIG. 4 shows a view from below of the boot lid in FIG. 3 such as would be seen by looking in the direction of the arrow F.

According to the embodiment of the invention described in detail in FIG. 4, the pressure-sensitive tape 11 is situated in a continuous fashion around the entire periphery of the lid 3. According to another embodiment of the invention, the pressure-sensitive tapes 11 are only placed on certain sections of the periphery of the lid 3. More particularly, the pressure-sensitive tape 11 can be situated only in the most dangerous areas, such as the areas situated next to the front 5 and rear 6 hinges of the lid 3.

According to the embodiment of the invention described in detail in FIGS. 5 to 9, the edges 10 of the openings 3, 4 are formed by the end of a crimping.

The skin 17 of the openings 3, 4, in other words, the part of the body that is turned towards the outside, is turned over so as to sandwich the edge of the lining 18 of the opening 3, 4. The part of the skin 17 that is turned over to form the crimping is called folded edge of the crimping. The part of the opening 3, 4 situated in the continuity of the crimping opposite the edge 10 comprises a shoulder.

In an embodiment of the invention, the pressure-sensitive tape 11 is placed on the folded edge of the crimping.

The pressure-sensitive tape 11 is associated with a strip 16 that supports the pressure-sensitive tape and/or transmits pressure to it.

The strip 16 is made from an elastic material. The elastic material is preferably a synthetic material such as a foam. The synthetic material used can, for example, be polyurethane.

The hardness of the elastic material used is comprised between 15 and 70 shores, preferably between 30 and 60 shores. Thus the material enables both the transmission of the pressure and to limit the pinching effect, particularly when involving a finger or a hand.

Figure 5A:
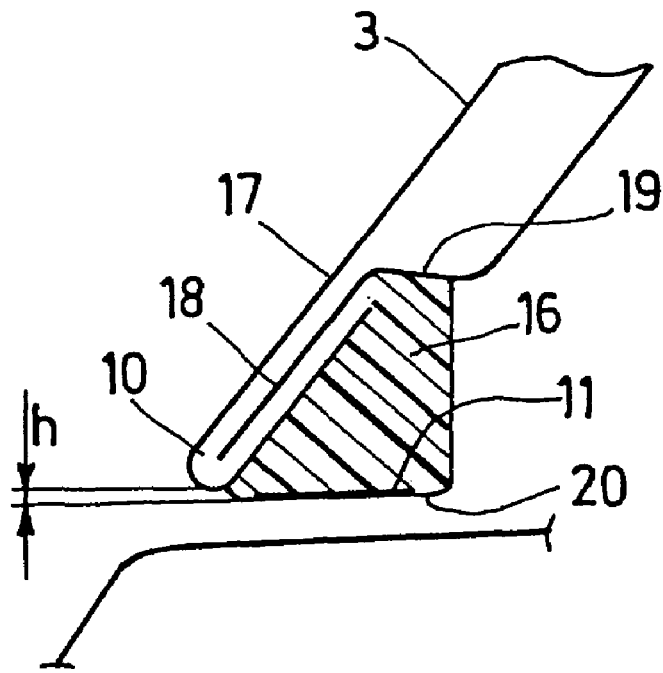
FIGS. 5a, 5b, 6a, 6b and 7 show an enlarged view of the circle in FIG. 3 according to different embodiments of the invention.

According to the embodiment of the invention of FIG. 5a, the pressure-sensitive tape 11 is fixed to the strip 16 of elastic material.

The pressure-sensitive tape 11 juts out slightly, by a height h, from the edge 10 which can pinch and is located facing a fixed part of the body. The pressure-sensitive tape forms a non-zero angle in relation to the folded edge of the crimping. The strip 16 rests on a shoulder 19 formed on the lining 18, and on the crimped edge of the inner surface 12 of the boot lid. In this embodiment of the invention, the pressure-sensitive tape 11 directly detects any contact with a foreign body or object.

Figure 5B:
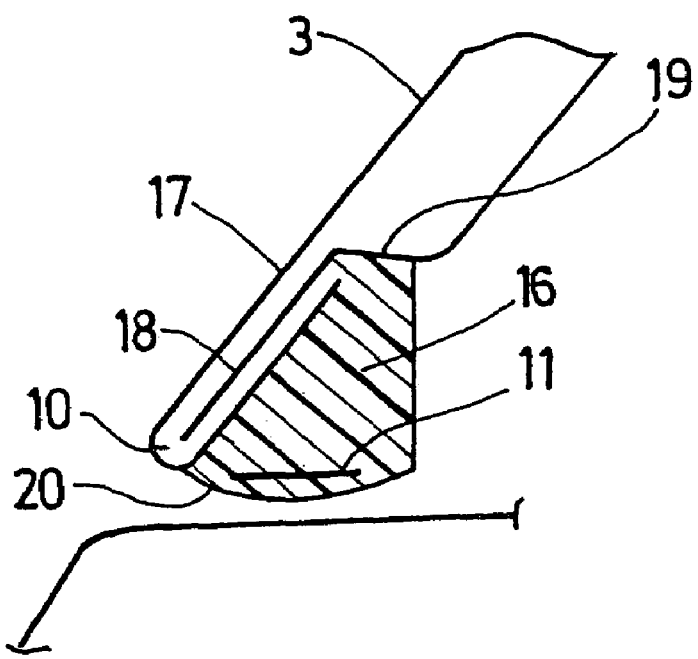

According to the embodiment of the invention shown in FIG. 5b, the pressure-sensitive tape 11 is also supported by a strip 16 of elastic material and is placed facing a part of the body. The pressure-sensitive tape 11 is inserted in the strip 16 so as to protect it from external aggressions. These external aggressions can be, for example, mechanical or weather-related aggressions.

Figure 6A:
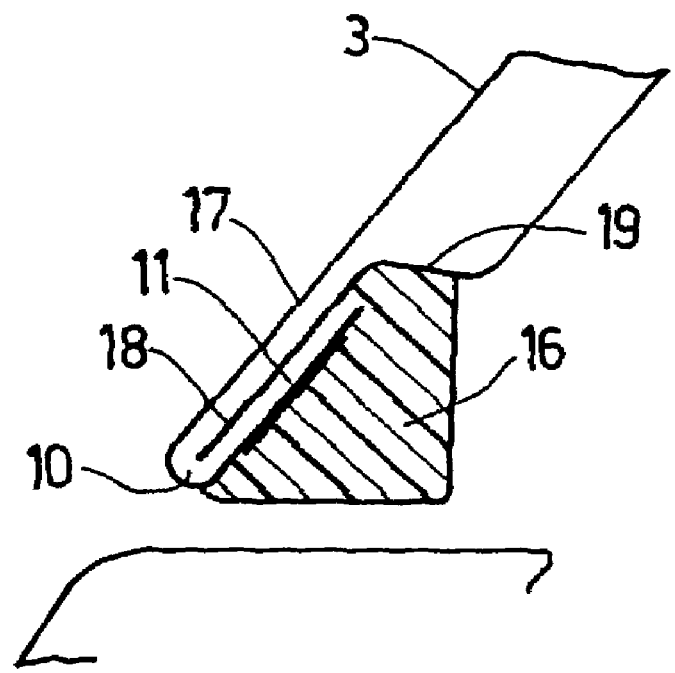
Figure 6B:
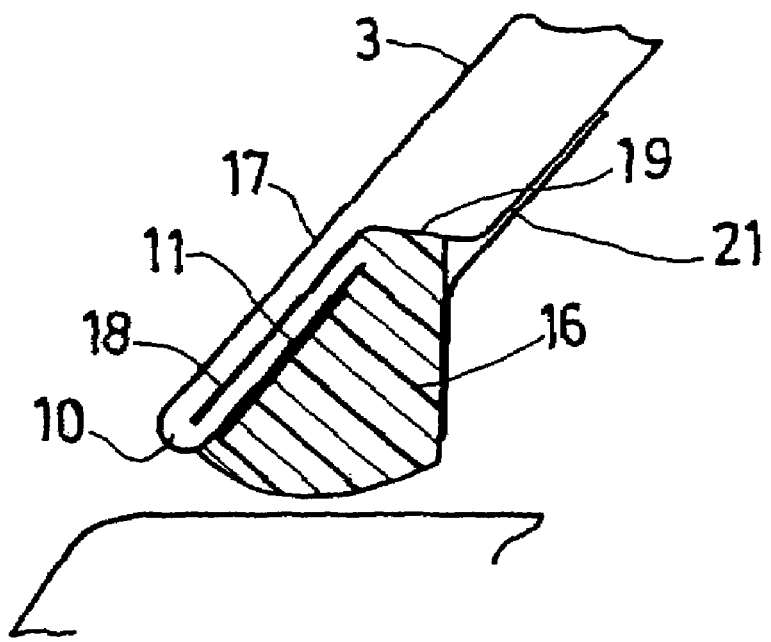
Figure 7:
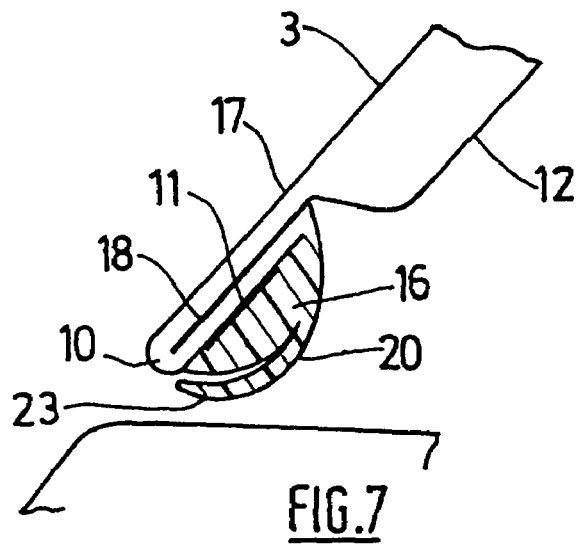

According to the embodiments of the invention shown in FIGS. 6a, 6b and 7, the pressure-sensitive tape 11 is fixed directly to the folded edge of the crimping, the strip 16 of elastic material covering the pressure-sensitive tape 11 completely. Thus, the tape 11 is particularly well protected from external aggressions.

The pressure applied to the edge 20 of the strip 16 facing the body element is transmitted by the strip 16 to the pressure-sensitive tape 11.

According to the embodiment of the invention shown in FIG. 6b, to improve the transmission of pressure, a cornice 21 providing an additional support surface is fixed to the lining 18 of the boot lid. With the aim of obtaining a maximum transmission of pressure, the curve of the strip 20 is preferably turned towards the body part.

The embodiment of the invention described in detail above describes a strip 16 that has a support surface on all its sides, with the exception of the surface 20 that is turned towards the body of the vehicle. This is why it is possible to use a very soft material, such as a foam; the use of a very soft material provides improved detection sensitivity.

According to the embodiment of the invention described in detail in FIG. 7, the strip 16 can also have a lip 24 turned towards the part of the body. A pinch on the lip 24 results in a deformation of the strip 16 which is detected by the pressure-sensitive tape 11. As an alternative, the lip 24 can be connected to the bottom part of the strip 16.

Figure 8:
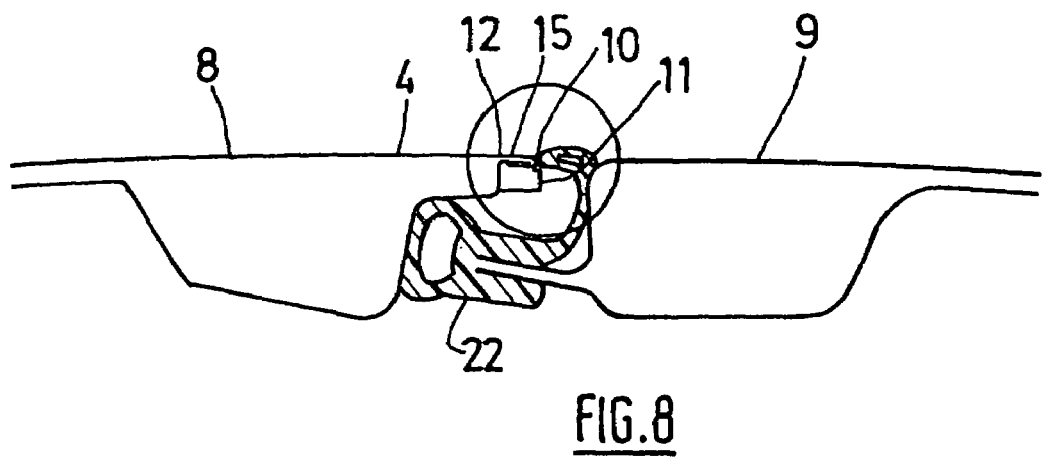
Figure 9:
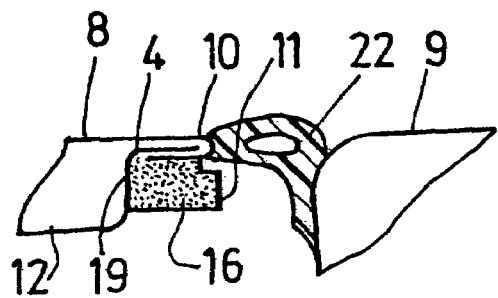

FIG. 8 shows the area situated between the rear edge 15 of the front roof element 8 and the front edge of the rear roof element 9.

The edges 10 of the front edge and the rear edge 15 of the front roof element 8 also consist of a crimping such as described previously. Likewise, the strip 16 rests against the turned-over edge of the crimping and against a shoulder 19 formed on the lining 18.

A seal 22 is fixed to the rear roof element 9 or to the crosspiece 23 of the windscreen in order to provide a watertight seal.

According to the embodiment of the invention shown in FIG. 9a, the pressure-sensitive tape 11 is fixed to the strip 16. The pressure-sensitive tape 11 juts out slightly from the edge 10 that can pinch and is situated facing the rear roof element 9 or the crosspiece 23 of the windscreen.

Although this embodiment of the invention is not shown, it is also possible to fix the pressure-sensitive tape 11 directly to the inner face 12 of the roof element 8. However, in this case, the pressure-sensitive tape 11 is fixed to the shoulder 19 of the lining 18 and not to the turned-over part of the crimping.

It should be noted that all the embodiments of the strip 16 described in FIGS. 5 to 7 can also be applied to the roof elements 8, 9.

In another embodiment of the invention, not shown, the inner surface 12 of the opening 3, 4 can also be partially or completely covered with a pressure-sensitive sheet that can emit a signal according to said pressure. Thus, the inner surface 12 of the opening 3, 4 is also secured.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. Motor vehicle, comprising:
    a vehicle body;
    at least a first movable panel, movable between an open and a closed position in relation to the vehicle body, the first movable panel having a surface which, when the movable panel is in the closed position, is turned toward a part of the interior of the vehicle to be covered, and at least one edge which, in the closed position of the movable panel, engages the vehicle body;
    driving means for moving the first movable panel between the open and the closed positions;
    at least one sealing device placed between the first movable panel and the vehicle body;
    a pressure-sensitive tape spaced from the sealing device and placed on the surface proximate to the edge;
    means for generating a pressure signal in response to a pressure sensed by the tape; and
    a control unit for controlling the driving means, the control unit being responsive to the pressure signal.

2. Motor vehicle according to claim 1, wherein the pressure-sensitive tape is fixed directly to the surface, a strip made from an elastic material transmitting the pressure to said pressure-sensitive tape.

3. Motor vehicle according to claim 2, wherein the strip made from an elastic material is a foam.

4. Motor vehicle according to claim 2, wherein the hardness of the elastic material is between 15 and 70 shore.

5. Motor vehicle according to claim 4, wherein the hardness of the elastic material is between 30 and 60 shore.

6. Motor vehicle according to claim 2, wherein the edge is crimped, said strip being placed on a folded edge of the crimping.

7. Motor vehicle according to claim 6, wherein a part of an opening situated in the continuity of the crimped edge comprises a shoulder against which the strip is resting.

8. Motor vehicle according to claim 7, wherein the opening is defined by a lining, a cornice fixed to the lining providing an additional support surface for the strip.

9. Motor vehicle according to claim 2, wherein the strip forms a lip.

10. Motor vehicle according to claim 1, wherein said pressure-sensitive tape is fixed by means of a strip made from an elastic material to the surface.

11. Motor vehicle according to claim 10, wherein the pressure-sensitive tape forms a non-zero angle with the crimped folded edge.

12. Motor vehicle according to claim 10, wherein the pressure-sensitive tape is placed in the strip.

13. Motor vehicle according to claim 10, wherein the pressure-sensitive tape juts out a height h, from the edge and engaged a rigid part of the vehicle body.

14. Motor vehicle according to claim 1, wherein the control unit compares the signal of the measured pressure with rising thresholds.

15. Motor vehicle according to claim 14, wherein the control unit compares a variation in the pressure over time and a rate at which the variation speeds up and compares with rising thresholds.

16. Motor vehicle according to claim 1, slowing, stopping and reversing.

17. Motor vehicle according to claim 1, wherein the surface is at least partially covered with a pressure-sensitive sheet that emits a signal according to said pressure.

* * * * *